(12) United States Patent
Roach et al.

(10) Patent No.: US 6,623,645 B1
(45) Date of Patent: Sep. 23, 2003

(54) WASTEWATER CONTAINMENT AND TREATMENT METHODS

(75) Inventors: Gary W. Roach, Midwest City, OK (US); Elbert Glen Price, Anadarko, OK (US)

(73) Assignee: Dewater Solutions, Inc., Midwest City, OK (US)

( * ) Notice: Subject to any disclaimer, the term of this patent is extended or adjusted under 35 U.S.C. 154(b) by 177 days.

(21) Appl. No.: 09/697,855

(22) Filed: Oct. 27, 2000

(51) Int. Cl.[7] ............................ B01D 15/04; C02F 1/00
(52) U.S. Cl. .......................... 210/691; 210/692
(58) Field of Search ..................... 210/689, 690–692

(56) References Cited

U.S. PATENT DOCUMENTS

| | | | |
|---|---|---|---|
| 3,877,920 A | 4/1975 | Carlberg | 71/21 |
| 3,980,050 A | 9/1976 | Neubauer | 119/1 |
| 4,506,628 A | 3/1985 | Stockel | 119/1 |
| 4,511,477 A | 4/1985 | McKinley et al. | 210/689 |
| 4,773,906 A * | 9/1988 | Krushel | 604/391 |
| 4,883,021 A | 11/1989 | Ducharme et al. | 119/1 |
| 5,014,650 A | 5/1991 | Sowle et al. | 119/171 |
| 5,109,805 A | 5/1992 | Baldry et al. | 119/173 |
| 5,147,343 A * | 9/1992 | Kellenberger | 604/368 |
| 5,189,987 A * | 3/1993 | Stanislowski et al. | 119/171 |
| 5,339,769 A | 8/1994 | Toth et al. | 119/173 |
| 5,356,402 A * | 10/1994 | Gillies et al. | 604/375 |
| 5,362,399 A | 11/1994 | Schwarz et al. | 210/689 |
| 5,415,131 A | 5/1995 | Dodman | 119/171 |
| 5,421,276 A * | 6/1995 | Hooper, Jr. | 110/346 |
| 5,429,741 A | 7/1995 | Webb et al. | 210/242.4 |
| 5,451,613 A | 9/1995 | Smith et al. | 521/53 |
| 5,453,323 A | 9/1995 | Chambers et al. | 428/402 |
| 5,496,890 A | 3/1996 | Sackmann et al. | 525/329.1 |
| 5,567,779 A | 10/1996 | Sackmann et al. | 525/329.1 |
| 5,684,106 A | 11/1997 | Johnson et al. | 526/295 |
| 5,743,213 A | 4/1998 | Fujiura | 119/172 |
| 5,883,158 A | 3/1999 | Nambu et al. | 523/412 |
| 5,885,462 A * | 3/1999 | Biver et al. | 210/266 |
| 5,916,336 A * | 6/1999 | Middleton | 8/159 |
| 6,080,391 A * | 6/2000 | Tsuchiya et al. | 424/401 |
| 6,187,828 B1 * | 2/2001 | Woodrum et al. | 521/64 |
| 6,229,062 B1 * | 5/2001 | Mandell et al. | 604/367 |
| 6,277,772 B1 * | 8/2001 | Gancet et al. | 442/327 |
| 6,363,541 B1 * | 4/2002 | Tylka | 383/109 |
| 6,464,672 B1 * | 10/2002 | Buckley | 604/304 |

* cited by examiner

Primary Examiner—Chester T. Barry
(74) Attorney, Agent, or Firm—McAfee & Taft

(57) ABSTRACT

Superabsorbent polymers (SAPs) are used for the containment and treatment of wastewaters. SAPs are mixed with a wastewater in amounts sufficient to absorb substantially all of the wastewater and prevent it from leaving a defined containment area. The water can then be evaporated from the SAP to produce a substantially dry polymer composition containing the SAP and the wastewater contaminants. The dry polymer composition is discarded or, when appropriate, used as a fertilizer for plants. Surprisingly, the SAP reduces the odor associated with ammonia containing wastewaters by binding to the ammonia and reducing the ammonia gas present in the airspace around the wastewater. The evaporation process may be conducted in the presence of a heat exchanger to produce cool, fresh air that is used to cool facilities, particularly animal rearing and production facilities.

21 Claims, 2 Drawing Sheets

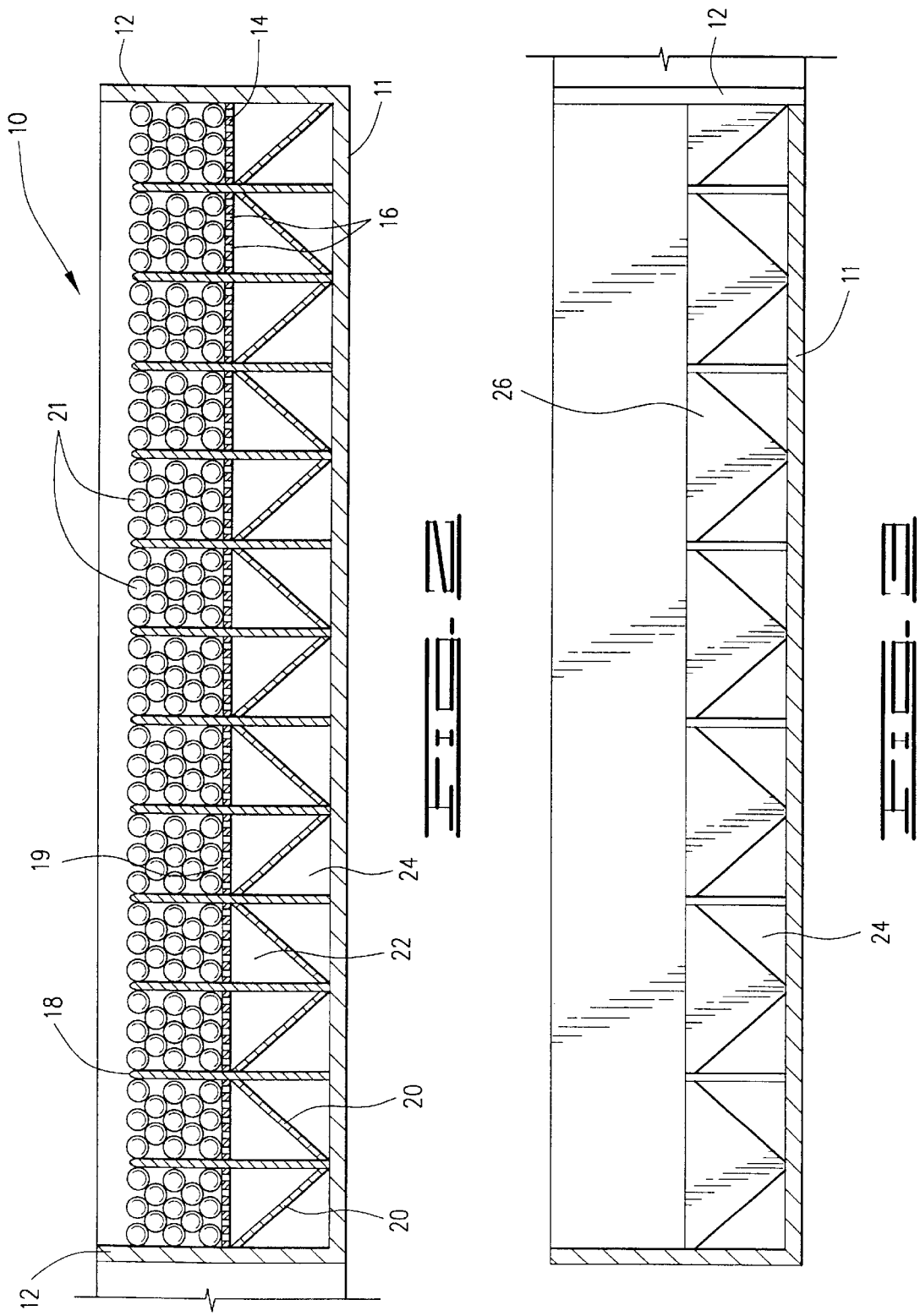

WASTEWATER CONTAINMENT AND TREATMENT METHODS

BACKGROUND OF THE INVENTION

1. Field of the Invention

This invention relates generally to methods and apparatus for the containment and treatment of wastewater and particularly to the use of superabsorbent polymers for the containment and treatment of wastewater.

2. Description of the Prior Art

Superabsorbent polymers (SAPs) are compounds capable of absorbing water and swelling to many times their original size and weight. SAPs generally absorb from about 100 to 1000 times their weight in water and some SAPs absorb up to 1500 times their weight in water. SAPs have many uses, e.g., as absorbing compounds in diapers and incontinence products, for protecting power and communication cables from moisture, in agriculture to increase the capability of soil to retain moisture and nutrients, and in the hygienic packaging of food products. SAPs are typically used alone in granular or powder form or in a composite form in which SAP particles are imbedded in pads or similar devices to enable easy handling and convenient use.

In general, these SAPs are wide-mesh cross-linked, water-insoluble polymers based on alkali metal salts of polyacrylic acid or copolymers of alkali metal salts of acrylic acid and acrylamide that are obtained by radical-initiated copolymerization of acrylic acid and polyfunctional monomers such as divinylbenzene, ethylene glycol dimethacrylate, ethylene glycol diallylether, butanediol acrylate, hexanediol methacrylate, polyglycol diacrylate, trimethylol propane diacrylate, allyl acrylate, diallyl acrylamide, triallylamine, diallylether, methylene bis-acrylamide, and N-methylol acrylamide. There are also SAPs based on hydrolyzates of graft copolymers of acrylonitrile on starch and on cross-linked starch/acrylic acid graft copolymers in which the carboxyl groups are partly neutralized.

While there are various types of SAPs known in the art, polyacrylic acid type SAPs are most often used for dewatering operations. Polyacrylic acid type SAPs are polymers containing an acrylic acid monomer unit of at least 50 mol % and are substantially water-insoluble while being highly absorbent and swellable for water. Such polyacrylic acid type SAPs include polyacrylic acid cross-linked polymers or copolymers, starch-acrylonitrile grafted polymer hydrolyzates, starch-acrylic acid grafted cross-linked polymers, and vinyl acetate-acrylic ester copolymer saponified products. In these polymers and copolymers, 60 to 90 mol % of the carboxyl groups thereof generally have their hydrogen atom substituted with an alkali metal.

Many SAPs are well known in the art. For example, U.S. Pat. No. 5,883,158 discloses a process for producing a SAP that absorbs up to 1500 times its weight in water. U.S. Pat. Nos. 5,567,779 and 5,496,890 disclose acrylonitrile based SAPs that absorb up to 1000 times their weight in water. U.S. Pat. No. 5,453,323 discloses a superabsorbent polymer having superior dryness that is made from acrylic acid and a cross-linking agent polymerized under controlled conditions. U.S. Pat. No. 5,451,613 discloses a carboxylic containing superabsorbent polymer having improved absorption rates and absorption under pressure. U.S. Pat. No. 5,684,106 discloses a particulate superabsorbent polymeric material which is a partially neutralized polymer of an ethylenically unsaturated carboxylic monomer cross-linked by a triethylenic or higher ethylenic cross-linking agent. Similarly, U.S. Pat. No. 4,511,477 discloses cross-linked polymers containing polymerized acrylamide and sodium 2-acrylamide-2-methylpropane sulfonate and their use to remove acidic water from fuels.

Wastewater is water containing dissolved and suspended contaminants. Wastewater comes in many forms. Wastewater can be sewage in the form of human or animal waste (human or non-human), effluents from food processing and canning operations, runoff from mining operations, radioactive wastes, hazardous wastes, or industrial waste from manufacturing operations. Wastewater is used herein to mean all such water based industrial and animal wastes.

The disposal of wastewater is a major problem throughout the world. Wastewater must be contained or controlled so that it does not pollute aquatic habitats for plants and animals and does not contaminate drinking water. In most instances, wastewater cannot be disposed of until the contaminants have been reduced to a level acceptable to governmental organizations, e.g., the Environmental Protection Agency. For radioactive and other hazardous wastes, there is no acceptable level for disposal. The wastewaters must be contained and the contaminants removed before disposal.

Wastewaters from animal rearing and production facilities are a major cause of air and water pollution. Ammonia is a common cause of odor in animal rearing and production facilities, particularly swine rearing facilities. The accumulation of manure and urine in these wastewaters results in the production of ammonia gas from ammonia volatilization and causes elevated levels of ammonia gas in the atmosphere. Accumulation of ammonia gas causes loss of production by the animals and causes respiratory problems for the animals. Ammonia can also accumulate around wastewaters from food processing and similar facilities.

Similarly, the disposal of wastewaters containing manure, urine, milk, feed, and the like is of great concern. Nutrients and other materials found in wastewaters containing animal waste contaminate ground and surface waters and contribute to eutrophication. Use of untreated agricultural wastewaters as fertilizers has proven problematic because of biological contaminants in the wastewaters. Also, the cost of transporting untreated wastewaters is very high since most of the cost is associated with transporting the water that makes up a large portion, usually greater than 95%, of the waste. There exists, therefore, a need for methods and apparatus to control the odor caused by wastewaters and methods and apparatus for treating wastewaters to manage the excess nutrients in many wastes, particularly if the nutrients can be reused as a fertilizer.

The containment and treatment of wastewater is often a major cost associated with a business enterprise. Much effort has been devoted to developing methods and apparatus for containing and treating wastewater in an economical way, e.g., using as little energy as possible, reusing materials and energy if possible, and minimizing the amount of solid waste. Despite this effort, however, there exists a continuing need for new methods and apparatus for economically and efficiently containing and treating wastewater and for managing the byproducts of such treatment methods.

SUMMARY OF THE INVENTION

It is, therefore, an object of the invention to provide new methods and apparatus for the containment and treatment of wastewater.

It is another object of the invention to provide new methods and apparatus for producing fertilizers and fertilizers produced by such methods.

It is a further object of the invention to provide new methods and apparatus for controlling odor caused by ammonia in wastewaters.

It is another object of the invention to provide new methods and apparatus for generating cool air utilizing the evaporation process involved with treating wastewaters.

These and other objects are achieved by using superabsorbent polymers (SAPs) for the containment and treatment of wastewaters. The SAPs absorb substantially all of the wastewater and prevent it from leaving a defined containment area. Once contained, the water can be evaporated from the SAP to produce a substantially dry polymer composition containing the SAP and the wastewater contaminants. The dry polymer composition can be discarded or, when appropriate, used as a fertilizer for plants and other vegetation. Advantageously, the SAP reduces the odor associated with ammonia containing wastewaters by binding to the ammonia and reducing the ammonia gas present in the airspace around the wastewater. The evaporation process may be conducted in the presence of a heat exchanger to produce cool, fresh air that can be collected and used to cool facilities, particularly animal rearing and production facilities.

Other and further objects, features and advantages of the present invention will be readily apparent to those skilled in the art upon a reading of the description of preferred embodiments that follows.

BRIEF DESCRIPTION OF THE DRAWINGS

FIG. 2 is a cross-sectional view at section 2—2 of the apparatus illustrated in FIG. 1.

FIG. 3 is a cross-sectional view at section 3—3 of the apparatus illustrated in FIG. 1.

DETAILED DESCRIPTION OF THE INVENTION

Figure 1:
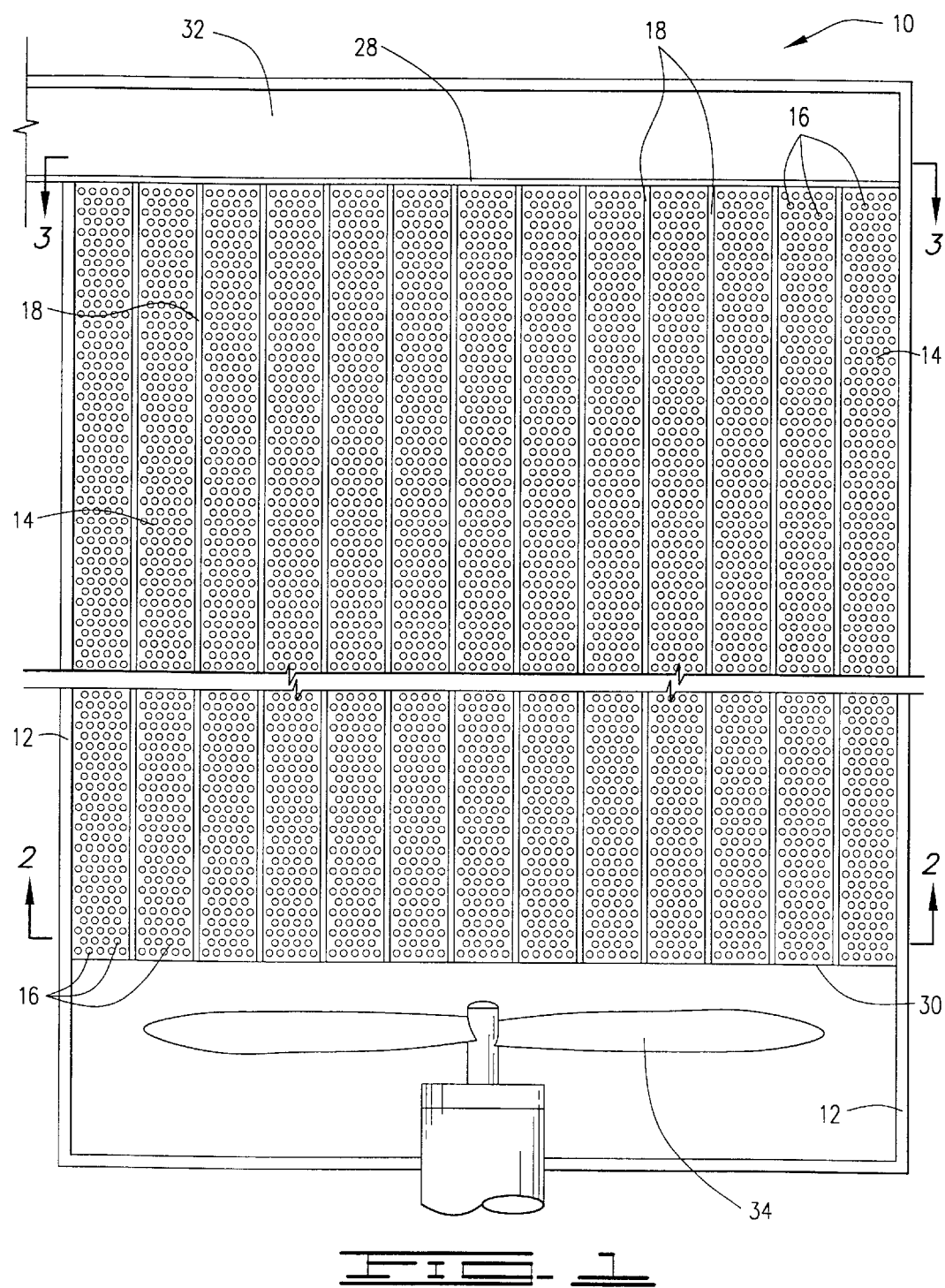
FIG. 1 is a plan view of the apparatus of the present invention.

The present invention provides new methods and apparatus for the containment and treatment of wastewaters. The methods for contaminant of wastewater comprise contacting the wastewater with a superabsorbent polymer (SAP) in a defined containment area and allowing the SAP and the wastewater to interact until substantially all of the wastewater is absorbed by the SAP. The SAP is contacted with and allowed to absorb the wastewater before the wastewater leaves the defined containment area. The containment methods, therefore, prevent the wastewater from leaving the area where it was generated and from entering adjacent aquifers and surface waters.

The methods for treatment of wastewater comprise contacting a wastewater with a SAP, allowing the SAP and the wastewater to interact until substantially all of the wastewater is absorbed by the SAP, evaporating the water from the SAP to produce a substantially dry polymer composition containing the SAP and the wastewater contaminants, and disposing of the substantially dry polymer composition. The treatment methods, therefore, separate the water from its contaminants and facilitate the individual disposal or reuse of the water and the contaminants.

The SAPs useful in the present invention are those known in the art. Useful SAPs include, but are not limited to, commercial products sold under the trademarks and tradenames AmiSorb® and Magnet™ available from the Donlar Corporation of 6502 South Archer Road, Bedford Park, Ill. 60501, Stockosorb®, Stockosorb 400K, Stockosorb Agro available from Stockhausen, Inc., Chem-Posites™ available from Emerging Technologies, Inc., 12-F Wendy Court, Greensboro, N.C. 27409, Horta-Sorb® available from Hotsorb, PO Box 5744, Sarasota, Fla. 34277, and Terra-Sorb™ available from Industrial Services International, Inc. Preferably, the SAP is an organic cross-linked acrylamide/acrylic acid copolymer based on potassium salt with water binding groups that dissociate into negatively charged carboxyl ions which contain large numbers of ionic groups that repel each other. Such preferred SAPs are available commercially from known sources, e.g., Exacto, Inc., 7617 State Route 31, Richmond, Ill. 60071, under the trademark SORBEX™ superabsorbent polymer.

The SAPs are interacted with the wastewater in an amount sufficient to absorb substantially all of the wastewater. The amount of SAP needed to absorb substantially all of the wastewater depends somewhat upon the source of the wastewater and the contaminants therein. Generally, the SAP is contacted with the wastewater in an amount of from about 2 to about 200 grams of SAP per liter of wastewater, preferably from about 10 to about 100 grams of SAP per liter of wastewater.

The wastewater contained or treated according to the present invention can be any wastewater from industrial or animal wastes. Human and other animal sewage can be contained and treated by the methods of the present invention, particularly those from swine, dairy, and poultry operations. Similarly, swine runoff containing dissolved solids and other contaminants, slaughterhouse effluents, tanning process effluents, food processing, canning, and the like can be treated using these methods. Radioactive and hazardous wastewaters produced during the generation of radioactive and other materials for use by industry can also be treated by the above methods. Also, wastewater spills and their containment and treatment are encompassed by the methods of the present invention. For example, the spill of an aqueous solution containing a pesticide can be contained by contacting the spill with SAPs and allowing the SAP to absorb the solution. The spill can be treated by removing the SAP containing the solution from the spill site and evaporating the water to produce a substantially dry polymer composition containing the SAP and the pesticide. The polymer composition can then be disposed of by techniques appropriate for the pesticide. Preferably, the wastewater is selected from the group consisting of wastewaters from confined animal feeding operations and food processing operations.

Wastewaters can also be generated by passing air around or through contaminated solids or liquids such that the air becomes contaminated with undesirable waste gases. The contaminated air is then passed through water where the contaminants dissolve in the water to produce a wastewater that can be treated with the SAPs of the present invention. In one embodiment, air is passed through an enclosed animal rearing facility where the ammonia gas generated by animal wastes becomes mixed with the air. The contaminated air is bubbled through water where the ammonia dissolves in the water to produce a wastewater ammonia solution. The resulting ammonia solution is contacted with SAPs to absorb the ammonia solution and the SAP is treated according to the methods described herein. In a particularly preferred embodiment, the SAPs are in the water when the air containing ammonia is bubbled through the water.

The SAPs are contacted with the wastewater by any convenient means. The SAPs can be added to standing wastewaters in granular or powder form or the SAPs can be added to a collection tank and the wastewaters allowed to run or trickle into the tank and contact the SAPs as the wastewater is generated. The SAPs can be spread on the floor or subfloor of a worksite or in an animal's cage and allowed to contact the wastewater as it is generated. For spills, the SAPs can be spread onto the spill and allowed to absorb the spilled wastewater.

In one embodiment, wastewaters that may contain bacteria, virus, protozoa, yeasts, fungi, or other biological agents, e.g., wastewaters generated in animal and food processing operations, are separated from the SAP by a selective membrane that allows water molecules and other relatively small wastewater components to pass through the membrane and interact with the SAP but does not allow the biological agents to pass through the membrane and interact with the SAP. By eliminating the biological agents from the SAP, the SAP's useful life is extended and the SAP can be disposed of without treatment to reduce or eliminate the potentially harmful biological agents. Membranes useful in this method include any membrane known to have a pore size that will retain the biological agents while allowing water to pass through the membrane.

Upon contact, the SAP and wastewater are allowed to interact until the wastewater and its contaminants are absorbed by the SAP and produce a gel that can be dewatered through evaporation to produce a substantially dry polymer composition containing the SAP and the wastewater contaminants. While it is desirable to remove all of the water through evaporation, the SAPs of the present invention are substantially dry when about 75% or more of the water has been removed. Preferably, about 90% of the water is removed.

The water can be evaporated by any convenient means. Preferably the gel is exposed to an air-flow that facilitates the evaporation of the water. Such air-flow can be from a natural source such as convection or the wind or can be artificially produced by fans or similar apparatus. Heat can be added to the system to facilitate evaporation if required but is not preferred because of the cost.

The substantially dry polymer composition containing the SAP and the wastewater contaminants produced by the evaporation process can be disposed of by discarding the dry polymer composition, e.g., by incineration or in a landfill, or can be reused by again contacting the substantially dry polymer composition with wastewater. However, at some point when the polymer composition has collected sufficient contaminants and is no longer efficient at absorbing the wastewater, the determination of which is well within the skill of the artisan, the polymer composition cannot be reused and must be discarded.

When the contaminants in the polymer composition have no beneficial use, the polymer composition is disposed of by discarding it as described herein. However, when the contaminants have a beneficial use, the polymer composition may be disposed of by using it for a beneficial purpose. For example, when the wastewater contains sewage or other elements useful as a fertilizer, the dry polymer composition can be processed and spread on soil as a fertilizer to promote plant growth. The present invention, therefore, provides a method for producing a fertilizer and a fertilizer useful for promoting plant growth. The method for producing the fertilizer comprises contacting a wastewater containing contaminants useful as a fertilizer with a SAP, allowing the SAP and the wastewater to interact until most or substantially all of the wastewater is absorbed by the SAP, evaporating the water from the SAP to produce a substantially dry polymer composition containing the SAP and the wastewater contaminants useful as a fertilizer, and disposing of the substantially dry polymer by applying the dry polymer as a fertilizer.

Generally, the dry polymer composition is separated from other contaminants by meshes or sieves, treated to destroy any unwanted biological agents, and transported to farmlands for use as a fertilizer. The polymer composition could, however, be bagged and sold for use in greenhouses or other botanical applications. The type of fertilizer produced and type of plant that can use the fertilizer will depend upon the source and content of the wastewater. For example, when the wastewater is from a swine, dairy, or poultry production facility, the polymer composition is useful as a fertilizer for pastures. Alternatively, the polymer composition could be blended with other fertilizers to produce a desirable fertilizer mixture useful in almost any application.

In a preferred embodiment, SORBEX™ 9001-XGL superabsorbent polymer is mixed with wastewater known to contain animal wastes, preferably from a swine production facility, at an amount of 50 grams of SAP per liter of wastewater. The SAP absorbs substantially all of the wastewater and produces a gel containing the wastewater. The gel is transported to an evaporation platform where it is spread to allow air to flow easily about the gel. The water in the gel is evaporated by the use of fans to circulate air about the gel and evaporate the water. The substantially dry SAP containing the contaminants is collected and contacted with another batch of wastewater and the cycle is repeated. If the substantially dry SAP contains excess contaminants, it is disposed of according to methods of the present invention and new SAP is used in the process.

The present invention also provides new methods for controlling the odor caused by ammonia in wastewaters. Surprisingly, it has been discovered that SAP exposed to wastewaters that contain ammonia will reduce the amount of ammonia in the airspace surrounding the wastewater. The methods of the present invention for controlling odor caused by ammonia in wastewaters comprise contacting the wastewater with a SAP and allowing the SAP and the wastewater to interact until a substantial portion of the ammonia gas in the wastewater and in the airspace surrounding the wastewater is physically or chemically bound to the SAP. This reduces the amount of ammonia gas in the airspace around the wastewater and reduces the odor caused by the ammonia gas.

The SAP is added in sufficient quantities to bind to the ammonia but not to completely absorb the wastewater. Generally, the SAP is added to the wastewater in amounts of from about 1 gram to about 30 grams of SAP per liter of wastewater. The SAPs have been found to bind to and remove up to 60% of the total ammonia gas from the airspace surrounding the wastewater, particularly when the airspace is enclosed and the ammonia gas cannot escape to the atmosphere.

In a preferred embodiment, wastewater from a swine rearing facility is mixed with SAP in an amount of from about 10 grams of SAP per liter of wastewater. The SAP binds to the ammonia in the wastewater and reduces the ammonia gas in the airspace around the wastewater by up to about 40%. This significantly reduces air pollution, reduces the odor encountered by the animals and the human caretakers and increases the habitability of the facility for the animals and the caretakers.

The present invention also provides new methods for generating cool air utilizing the evaporation process involved with treating wastewaters according to the present invention. The method comprises evaporating the water from the gels produced by the absorption of wastewaters by SAPs. The evaporation process provides a cooling effect. In a preferred embodiment, wastewaters generated by animal rearing facilities, particularly swine rearing facilities, are absorbed by SAPs to produce gels containing the wastewater. The water in the gels is evaporated in the presence of a heat exchanger. The evaporation process cools the air in the heat exchanger and the cool air is circulated throughout the animal rearing facility. This process provides cool, fresh air to the animals and cools the facility.

The present invention also provides a new apparatus for generating cool air when evaporating the water from SAPs according to the present invention. The apparatus is shown in FIGS. 1–3 and generally referred to by the numeral 10. Referring to FIGS. 1–3, the apparatus 10 has a floor 11 with two side walls 12 connected to floor 11. Apparatus 10 has a top 14 connected to walls 12 and positioned above and generally parallel to floor 11. Top 14 is perforated such as by a plurality of holes 16 that allow air to pass through the top. The device also has a plurality of ridges 18 attached to and extending perpendicular from floor 11 above the top. Ridges 18 extending above top 14 form a space 19 that can contain materials, e.g., a SAP 21 that has absorbed wastewater. Apparatus 10 has a plurality of plates 20 angularly disposed between walls 12 and floor 11 and between ridges 18 and floor 11. The ridges 18, plates 20, and top 14 form a first air passageway 22 and the ridges 18, plates 20, and floor 11 form a second air passageway 24 that permits air to enter and exit apparatus 10. Apparatus 10 contains an end plate 26 on the exit end 28 of apparatus 10 that sealably covers the end of first air passageway 22. End plate 26 prevents air from escaping through exit end 28 and forces air entering first passageway 22 through the entry end 30 to exit through holes 16 in top 14. Apparatus 10 has a cool air plenum 32 on exit end 28 that is sealably connected to second air passageway 24. Plenum 32 is connected such that air entering second air passageway 24 through entry end 30 must exit apparatus 10 through plenum 32 where it can be collected and routed as desired.

In operation, the SAP 21 that has been used to collect wastewater according to the present invention is placed in space 19 formed by ridges 18 above top 14 such that the SAP 21 covers holes 16 in top 14. Holes 16 are sized to prevent the SAP 21 from passing through holes 16 and into first air passageway 22. Air is forced through first and second air passageways 22, 24 through entry end 30 using a fan 34 or other air moving device. The air in first air passageway 22 must exit through holes 16 in top 14 because end plate 26 prevents the air from exiting through exit end 28. The air exiting through holes 16 contacts the SAP 21 in space 19 and evaporates the water from the SAP 21. The process of evaporation cools apparatus 10 in general and, in particular, cools ridges 1.8 and plates 20. Air passing through second air passageway 24 is cooled by the now cool ridges 18 and plates 20. Cooling fins and similar devices (not shown) may also be added to second air passageway 24 to improve cooling efficiency. The cool air exits second air passageway 24 and enters plenum 32 at the exit end 28 of apparatus 10. The cool air can be collected and routed as desired. The ridges 18, plates 20, and top 14 should be constructed of a material that is a good conductor of heat, e.g., aluminum, such other materials being known to the skilled artisan.

In another aspect, the present invention provides a method for generating cool air using the device of the present invention and a SAP that has been used to absorb water, preferably wastewater. The method comprises placing a SAP that has absorbed water in the space formed by the ridges above the top of the device, forcing air through the device, and collecting cool air from the second passageway in the plenum.

Apparatus 10 may be easily adapted to the specific wastewater treatment application. For example, in the application of treating animal waste, a livestock containment facility can be constructed using apparatus 10. In this application, animal waste is secreted directly or indirectly into the SAP 21. Fan 34 periodically or continuously moves air through first air passageway 22 and through holes 16 in top 14 to keep the wastewater contaminant substantially dry and extend the useful life of the SAP 21. The air moving across the SAP 21 is cooled which in turn cools the area above the SAP 21, i.e., the livestock containment facility. This evaporation process, which results in cool air in second passageway 24 collected at plenum 32, can be also circulated into the livestock containment facility for additional cooling effect or into a completely different facility. Similar adaptations of apparatus 10 to the specific wastewater treatment applications described herein are readily apparent to one skilled in the art.

In order to further illustrate the methods and compositions of the present invention, the following examples are given.

EXAMPLE 1

Initial Screening for Ammonia Absorption Using SORBEX™ 9001-XLG

An initial screening test was conducted using household ammonia solutions of various strength dilutions and household ammonia solutions treated with the SAP SORBEX™ 9001-XLG. Solutions were made from household ammonia (14% strength) and diluted to 10% and 1% of original strength with distilled water. Approximately 1 gram of SAP and 50 ml of the solution to be tested were placed in a 500 ml glass jar and sealed with Saran Wrap™. The system was allowed to equilibrate for 4 hours. The equilibrated systems were analyzed for the presence of ammonia by having three panel members, designated A, B and C, sniff the system and score for the odor of ammonia. The scores were: 0=absent, 1=weak presence, and 2=strong odor detected. The entire experiment was replicated and the replications totaled. The results are shown in Table 1.

TABLE 1

| Solution Strength | Treatment | Replication 1 A B C | Replication 2 A B C | Rating by Panel Total Score (6 total observations) |
|---|---|---|---|---|
| Distilled Water | None | 0 0 0 | 0 0 0 | 0 |
| Distilled Water | +1 gm SAP | 0 0 0 | 0 0 0 | 0 |
| 0.14% | None | 1 1 1 | 1 1 1 | 6 |
| 0.14% | +1 gm SAP | 0 0 0 | 0 0 0 | 0 |
| 1.4% | None | 2 2 1 | 2 2 2 | 11 |
| 1.4% | +1 gm SAP | 1 1 2 | 2 1 2 | 9 |

Referring to Table 1, the results show that ammonia was not detected by sniffing headspace air when the solutions contained less than 1.4% ammonia. Therefore, SAPs are effective for absorbing ammonia from ammonia containing solutions.

EXAMPLE 2

Waste Treatment from Swine Production

Groups of swine (six littermates) with an initial weight of 30 to 35 pounds each were placed in pairs in open cages with self-feed and water. The cages had false floors (wire mesh) which allowed the urine and feces to pass through to a large pan just below. In the first pan, water was added (and the level maintained during the week compensating for evaporation) to mix with the swine wastes according to standard methods of rearing feeder pigs in commercial operations. In the pan below the second cage, 100 grams of SORBEX™ 9001-XLG was added and adjusted to leave free water initially (level also maintained). Under the third cage, 300 grams of SORBEX™ 9001-XLG was spread on the pan floor with no water, with the urine swelling the SAP during the trial.

At the end of one week, the cages were totally enclosed under tarpaulin covers, and intake hoses for one of three identical aquarium air pumps placed in the upper portion of each cage which was allowed to set for a twelve hour period. The pumps were then activated for 12 hours, discharging into one liter of distilled water. The resulting solutions were analyzed for ammonia content. The unexposed distilled water source was included in the samples along with unexposed water from the trial site.

The wastewater from pans 1 and 2 were diluted 10:1 and sampled for ammonia. Each measurement was completed using EPA method 330.3. The results are shown in Table 2.

Afterwards, the SAP/waste mixtures were allowed to dry in air on screen wire tables and observed over several cycles of drying and rehydration. The SAP became discolored after several cycles to a dark amber color. This discoloration, however, did not significantly effect the SAPs ability to absorb water.

TABLE 2

| Treatment | Concentration Head Space Air Solution | Sample Source Wastewater From Pan |
|---|---|---|
| 1) First Cage | 15.50 mg/L | 198 mg/L |
| 2) Second Cage | 8.92 mg/L | 166 mg/L |
| 3) Third Cage | 3.74 mg/L | * |
| 4) Distilled Water | 0.05 mg/L | |
| 5) Water From Site | 0.22 mg/L | |

* No valid test could be made on the sample source from the Third Cage because the SAP/waste was totally absorbed Referring to Table 2, the results show that the ammonia in the headspace air was correlated to the ammonia in the solution, that the waste stream could be fully absorbed by the SAP, and that the SAP gel maintained its ability to shrink and swell with wet/dry cycles, even though the SAP was colored in the process to various shades of brown. Therefore, SAPs such as SORBEX™ 9001-XGL can be used to contain, treat, and abate swine waste streams.

EXAMPLE 3

Ammonia Absorbing Capacity of SAPs 400 milliliters of a 1.4% ammonia solution was added to either zero or 3 grams of SORBEX™ 9001-XLG. The solutions were allowed to stand in closed containers for 1 hour. The supernatant was then removed to another closed container. The supernatant was tested using standard EPA electrode testing procedures to determine the amount of $NH_3$ and potassium present in the supernatant. Potassium was measured to determine if the ammonia was being physically or chemically bound to the SAP, an increase in potassium in solution indicating chemical binding because SORBEX™ 9001-XLG is a K salt SAP. Potassium is bound to the SAP and an increase in potassium concentration in solution indicates that potassium has been replaced by ammonia in the SAP structure. The results are shown in Table 3.

TABLE 3

| | Ammonia (mg) | Potassium (mg) | EPA Method |
|---|---|---|---|
| 400 ml of 1.4% solution | 1070 | 0.078 | 350.2 |
| 400 ml of 1.4% solution containing 3 grams of SAP | 910 | 0.290 | 200.7 |

Referring to Table 3, the results show that the SAP is absorbing the ammonia at these concentrations and that the ammonia is being chemically bound to the SAP.

EXAMPLE 4

Headspace Ammonia Determination

Deuterium was substituted for hydrogen in $NH_4$ and $H_2O$ in various ammonia concentrations. The headspace levels of ammonia were determined with a mass spectrometer that could adequately separate these greater weights. Seven vials with the following concentrations of ammonia were created: 0, 0.7, 1.4, 2.8, 7.0, 14 and 28%. 200 milligrams of SORBEX™ 9001-XLG were added to the vials. As shown in Table 4, the appropriate amount of $D_2O$ and $ND_4OD$ was added to the vial to produce a solution with a final volume of 10 milliliters.

TABLE 4

| Conc. (%) | SAP (mg) | $ND_4OD$ (ml) | $D_2O$ (ml) |
|---|---|---|---|
| 0 | 200 | 0 | 10.0 |
| 0.7 | 200 | 0.25 | 9.75 |
| 1.4 | 200 | 0.5 | 9.5 |
| 2.8 | 200 | 1.0 | 9.0 |
| 7 | 200 | 2.5 | 7.5 |
| 14 | 200 | 5.0 | 5.0 |
| 28 | 200 | 10.0 | 0 |

The solutions were allowed to equilibrate for 2 hours and then analyzed for ammonia by headspace GC/MS. The results are shown in Table 5.

TABLE 5

| Conc. % | MS* abundance | Ammonia level | Ammonia Present (+/−) |
|---|---|---|---|
| 0 | 630 | 0 | − |
| 0.7 | 770 | 140 | − |
| 1.4 | 753 | 123 | − |
| 2.8 | 731 | 101 | − |
| 7 | 3162 | 2530 | + |
| 14 | 11547 | 10917 | + |
| 28 | 26630 | 26000 | + |

*MS — Mass spectrometer

Referring to Table 5, the results show that the threshold for headspace "ammonia" was between 2.8 and 7.0% after long-term equilibration (over 24 hours).

While the preferred embodiments are shown to illustrate the invention, numerous changes to the materials and methods can be made by those skilled in the art. All such changes are encompassed within the spirit of the invention as defined by the appended claims.

What is claimed is:

1. A method for the containment of wastewater in a defined containment area, comprising:

contacting the wastewater with a superabsorbent polymer in the defined containment area;

allowing the superabsorbent polymer and the wastewater to interact until substantially all of the wastewater is absorbed by the superabsorbent polymer, thereby preventing the wastewater from leaving the defined containment area and entering adjacent aquifers and surface waters;

evaporating the water from the superabsorbent polymer to produce a substantially dry polymer composition; and disposing of the substantially dry polymer composition.

2. The method of claim 1 wherein the superabsorbent polymer is an organic cross-linked acrylamide/acrylic acid copolymer.

3. The method of claim 1 wherein the superabsorbent polymer is added to the wastewater in an amount of from about 2 grams to about 200 grams per liter of wastewater.

4. The method of claim 1 wherein the wastewater is selected from the group consisting of animal wastes and food processing wastes.

5. A method for the treatment of wastewater, comprising:

contacting the wastewater with a superabsorbent polymer;

allowing the superabsorbent polymer and the wastewater to interact until substantially all of the wastewater is absorbed by the superabsorbent polymer;

evaporating the water from the superabsorbent polymer to produce a substantially dry polymer composition containing the superabsorbent polymer and the wastewater contaminants; and disposing of the substantially dry polymer composition.

6. The method of claim 5 wherein the superabsorbent polymer is an organic cross-linked acrylamide/acrylic acid copolymer.

7. The method of claim 5 wherein the superabsorbent polymer is added to the wastewater in an amount of from about 2 grams to about 200 grams per liter of wastewater.

8. The method of claim 5 wherein the wastewater is selected from the group consisting of animal wastes and food processing wastes.

9. The method of claim 5 wherein the wastewater is wastewater from an animal rearing facility.

10. The method of claim 5 wherein evaporating the water is facilitated by the use of a fan.

11. The method of claim 5 wherein the dry polymer composition is disposed of by using the composition as a fertilizer.

12. The method of claim 5 wherein the wastewater and the superabsorbent polymer are separated during the contacting step by a selective membrane that allows water to pass through the membrane but does not allow biological agents to pass through the membrane.

13. A method for producing a fertilizer, comprising:

contacting a wastewater containing contaminants useful as a fertilizer with a superabsorbent polymer;

allowing the superabsorbent polymer and the wastewater to interact until substantially all of the wastewater is absorbed by the superabsorbent polymer;

evaporating the water from the superabsorbent polymer to produce a substantially dry polymer composition containing the superabsorbent polymer and the wastewater contaminants useful as a fertilizer; and disposing of the substantially dry polymer by applying the dry polymer as a fertilizer.

14. The method of claim 13 wherein the superabsorbent polymer is an organic cross-linked acrylamide/acrylic acid copolymer.

15. The method of claim 13 wherein-the superabsorbent polymer is added to the wastewater in an amount of from about 2 grams to about 200 grams per liter of wastewater.

16. The method of claim 13 wherein evaporating the water is facilitated by the use of a fan.

17. A fertilizer comprising the substantially dry polymer produced according to the method of claim 13.

18. A method for controlling odor caused by ammonia in wastewaters, comprising:

contacting the wastewater with a superabsorbent polymer;

allowing the superabsorbent polymer and the wastewater to interact until a substantial portion of the ammonia gas in the wastewater and in the airspace surrounding the wastewater is physically or chemically bound to the superabsorbent polymer;

evaporating the water from the superabsorbent polymer to produce a substantially dry polymer composition; and disposing of the substantially dry polymer composition.

19. The method of claim 18 wherein the superabsorbent polymer is an organic cross-linked acrylamide/acrylic acid copolymer.

20. The method of claim 18 wherein the superabsorbent polymer is added to the wastewater in an amount of from about 1 gram to about 30 grams per liter of wastewater.

21. The method of claim 18 wherein the wastewater is a wastewater from an animal rearing facility.

* * * * *